US007398932B2

(12) United States Patent
Ashili et al.

(10) Patent No.: US 7,398,932 B2
(45) Date of Patent: Jul. 15, 2008

(54) METHODS AND APPARATUS FOR PROVIDING A RADIO FREQUENCY IDENTIFICATION SYSTEM

(75) Inventors: Krishna Ashili, Phoenix, AZ (US); Andy Idsinga, Milwaukie, OR (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 11/101,786

(22) Filed: Apr. 7, 2005

(65) Prior Publication Data

US 2006/0226213 A1     Oct. 12, 2006

(51) Int. Cl.
*G06K 19/06*     (2006.01)
(52) U.S. Cl. .................. 235/492; 235/375; 340/10.1; 340/10.51
(58) Field of Classification Search ............ 235/492, 235/375; 340/10.1, 10.51, 572.1
See application file for complete search history.

(56) References Cited

U.S. PATENT DOCUMENTS

| | | | | |
|---|---|---|---|---|
| 4,825,058 A | * | 4/1989 | Poland | 235/462.01 |
| 5,905,249 A | * | 5/1999 | Reddersen et al. | 235/462.15 |
| 6,149,063 A | * | 11/2000 | Reynolds et al. | 235/472.02 |
| 6,161,760 A | * | 12/2000 | Marrs et al. | 235/462.15 |
| 6,539,422 B1 | * | 3/2003 | Hunt et al. | 709/217 |
| 6,677,852 B1 | * | 1/2004 | Landt | 340/10.1 |
| 7,119,738 B2 | * | 10/2006 | Bridgelall et al. | 342/129 |
| 7,124,943 B2 | * | 10/2006 | Quan et al. | 235/451 |

\* cited by examiner

*Primary Examiner*—Ahshik Kim
(74) *Attorney, Agent, or Firm*—Schwabe, Williamson & Wyatt, P.C.

(57) ABSTRACT

Radio frequency identification (RFID) systems and methods are described herein that may allow RFID reader devices to automatically initiate an autonomous reader script in order to excute reader operations independent of a host computer and/or RFID tags. The initialization of the autonomous reader script may be based on a triggering event such as a predefined time period or in response to detecting a signal received from the host computer having a signal strength that is below a threshold level.

29 Claims, 3 Drawing Sheets

METHODS AND APPARATUS FOR PROVIDING A RADIO FREQUENCY IDENTIFICATION SYSTEM

TECHNICAL FIELD

The present disclosure relates generally to wireless communication systems, and more particularly, to methods and apparatus for providing a radio frequency identification (RFID) system.

DETAILED DESCRIPTION

In general, methods and apparatus for providing a radio frequency identification (RFID) system are described herein. The methods and apparatus described herein are not limited in this regard.

Figure 1:
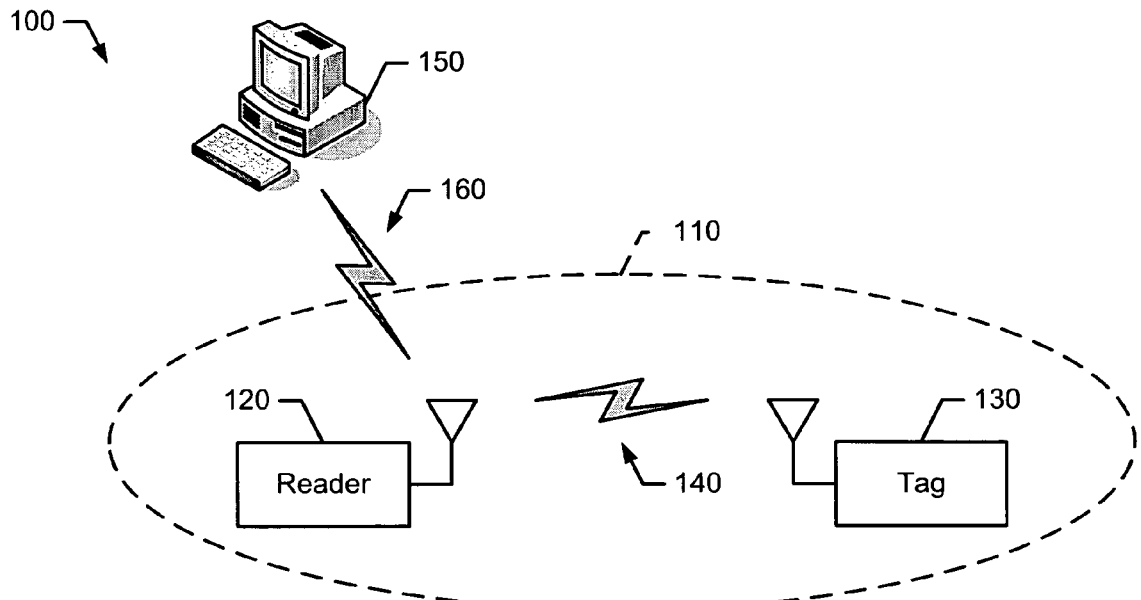
FIG. 1 is a schematic diagram representation of an example wireless communication system according to an embodiment of the methods and apparatus disclosed herein.

Referring to FIG. 1, an example wireless communication system 100 including a RFID system 110 is described herein. Wireless automatic identification and data capture (AIDC) technologies such as the RFID system 110 may be used to gather data and/or track physical objects. For example, the RFID system 110 may be used to identify inventory. In particular, the RFID system 110 may include an RFID reader 120 and an RFID tag 130. Although FIG. 1 depicts one RFID reader, the RFID system 110 may include more RFID readers. In a similar manner, the RFID system 110 may include more RFID tags while FIG. 1 depicts one RFID tag.

The RFID reader 120 and the RFID tag 130 may be communicatively coupled to each other via a wireless link 140. The RFID tag 130 may be physically coupled (e.g., attached to and/or incorporated into) to a physical object such as a store item, a library book, a pet, a vehicle, etc. The RFID reader 120 may be configured to store and retrieve data from the RFID tag 130 for a variety of applications. In one example, the RFID reader 120 and the RFID tag 130 may use low frequency signals (e.g., a range between 125 to 134 kilohertz (kHz) or a range between 140 to 148.5 kHz) to communicate via the wireless link 140 in animal identification systems and/or vehicle key-and-lock systems. In another example, the RFID reader 120 and the RFID tag 130 may use high frequency signals (e.g., 13.56 megahertz (MHz) to communicate via the wireless link 140 in tracking systems for books, luggage, and/or apparel items. Further, the RFID reader 120 and the RFID tag 130 may also use ultra high frequency (UHF) signals (e.g., a range between 868 to 956 MHz) and/or microwave signals (e.g., 2.45 gigahertz (GHz) to communicate via the wireless link 140. The methods and apparatus described herein are not limited in this regard.

The wireless communication system 100 may also include a host computer 150. The host computer 150 may process data retrieved by the RFID reader 120 from the RFID tag 130. For example, the host computer 150 may be a desktop computer, a laptop computer, a handheld computer, a tablet computer, a server, and/or other suitable processing device. The RFID reader 120 may be communicatively coupled to the host computer 150 via a wireless link 160 and/or a wired link (not shown). The RFID reader 120 may use a variety of modulation techniques such as time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with the host computer 150. For example, the RFID reader 120 may implement OFDM modulation to transmit large amounts of digital data by splitting a radio frequency signal into multiple small sub-signals, which in turn, are transmitted simultaneously at different frequencies. In particular, the RFID reader 120 may use OFDM modulation as described in the 802.xx family of standards developed by the Institute of Electrical and Electronic Engineers (IEEE) and/or variations and evolutions of these standards (e.g., 802.11x, 802.15, 802.16x, etc.). In one example, the RFID reader 120 may operate in accordance with the 802.16 family of standards developed by IEEE to provide for fixed, portable, and/or mobile broadband wireless access (BWA) networks (e.g., the IEEE std. 802.16, published 2004).

The RFID reader 120 may also use direct sequence spread spectrum (DSSS) modulation (e.g., the IEEE std. 802.11b) and/or frequency hopping spread spectrum (FHSS) modulation (e.g., the IEEE std. 802.11). Further, the RFID reader 120 may also operate in accordance with other suitable wireless communication protocols that require very low power such as Bluetooth, Ultra Wideband (UWB), and/or RFID to communicate with the host computer 150. Alternatively, the RFID reader 120 may communicate with the host computer 150 via one or more wired communication links (not shown). For example, the RFID reader 120 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate with the host computer 150. The methods and apparatus described herein are not limited in this regard.

Figure 2:
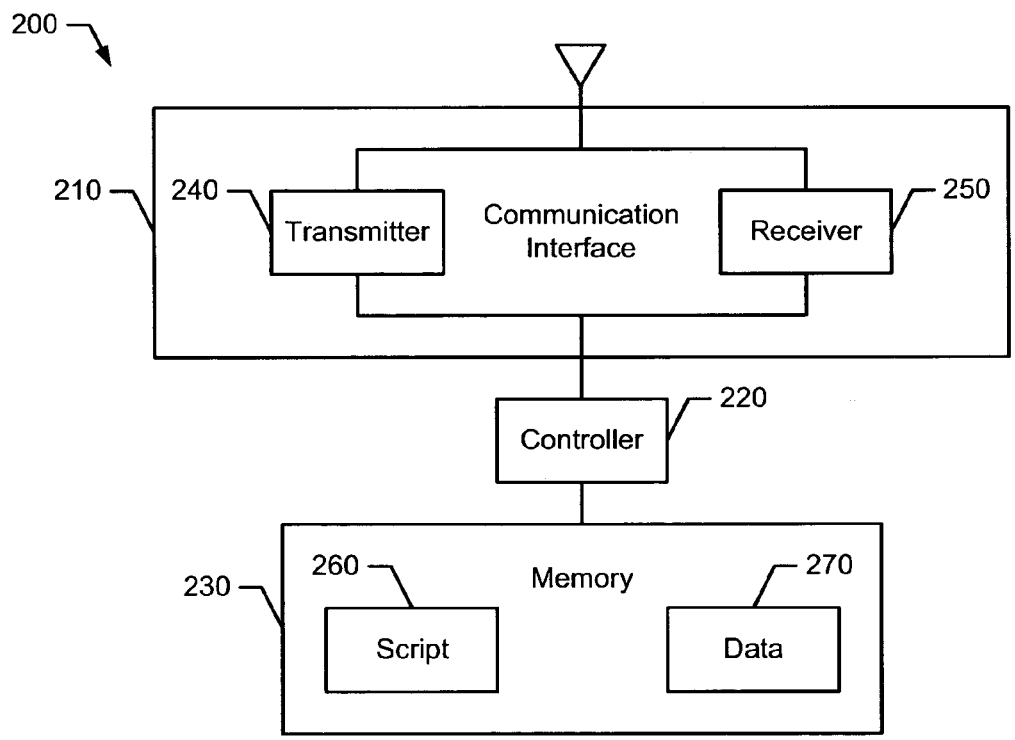
FIG. 2 is a block diagram representation of an example RFID reader of an RFID system.

In the example of FIG. 2, an example RFID reader 200 may include a communication interface 210, a controller 220, and a memory 230. The communication interface may include a transmitter 240 and a receiver 250 coupled to one or more antennas. The transmitter 240 may transmit radio frequency (RF) signals to one or more RFID tags (e.g., the RFID tag 130 of FIG. 1). The receiver 250 may receive RF signals from one or more RFID tags.

The controller 220 may be coupled to the communication interface 210 to communicate with a host computer (e.g., the host computer 150 of FIG. 1) and/or an RFID tag. To operate the RFID reader 200 in an autonomous mode, the controller 220 may initiate an autonomous reader script 260. The autonomous reader script 260 may include configuration information so that the RFID reader 200 may operate independent of reader commands from the host computer. In particular, the configuration information may include information associated with initialization, operation, and/or shut down of the RFID reader 200.

Based on the autonomous reader script 260, the controller 220 may execute a reader operation without reader commands from the host computer 150. In one example, the RFID reader 200 may continue to operate when the host computer 150 is shut down for maintenance. The reader operation may be a reading operation, a writing operation, a disabling operation, a storing operation, a filtering operation, and/or other suitable operation performed by the RFID reader 200. In particular, the RFID reader 200 may read data from or write data to RFID tag(s). The RFID reader 200 may also disable RFID tag(s) (e.g., "killing"). Further, the RFID reader 200 may filter data from RFID tag(s).

The controller 220 may initiate the autonomous reader script 260 automatically. In one example, the controller 220 may initiate the autonomous reader script 260 based on a predefined time period. The controller 220 may also initiate the autonomous reader script 260 based on an operating condition associated with the RFID reader 200. For example, the controller 220 may initiate the autonomous reader script 260 in response to detecting that the signal strength of a wireless link (e.g., the wireless link 160 of FIG. 1) between the RFID reader and a host computer is below a threshold level. In addition or alternatively, the controller 220 may initiate the autonomous reader script 260 based on tag information of RFID tag(s) read by the RFID reader 200. For example, the RFID reader 200 may perform a specific RFID operation on a number of item tags in response to reading a pallet tag. Further, the controller 220 may initiate the autonomous reader script 260 in response to a user input.

The memory 230 may be coupled to the controller 220 to store the autonomous reader script 260. For example, the RFID reader 200 may download the autonomous reader script 260 from a separate host computer and/or server (e.g., the host computer 150 of FIG. 1) to the memory 230. The memory 230 may also store data 270 read, written, and/or filtered by the controller 220 from RFID tag(s). The data 270 may be transmitted to the host computer.

While the components shown in FIG. 2 are depicted as separate blocks within the RFID reader 200, the functions performed by some of these blocks may be integrated within a single semiconductor circuit or may be implemented using two or more separate integrated circuits. In one example, although the transmitter 240 and the receiver 250 are depicted as separate blocks within the RFID reader 200, the transmitter 240 and the receiver 250 may be integrated into a single component (e.g., a transceiver). Further, the separate blocks within the RFID reader 200 may be integrated into a laptop computer, a handheld computer, a tablet computer, and/or other suitable wireless processing device. The methods and apparatus described herein are not limited in this regard.

Figure 3:
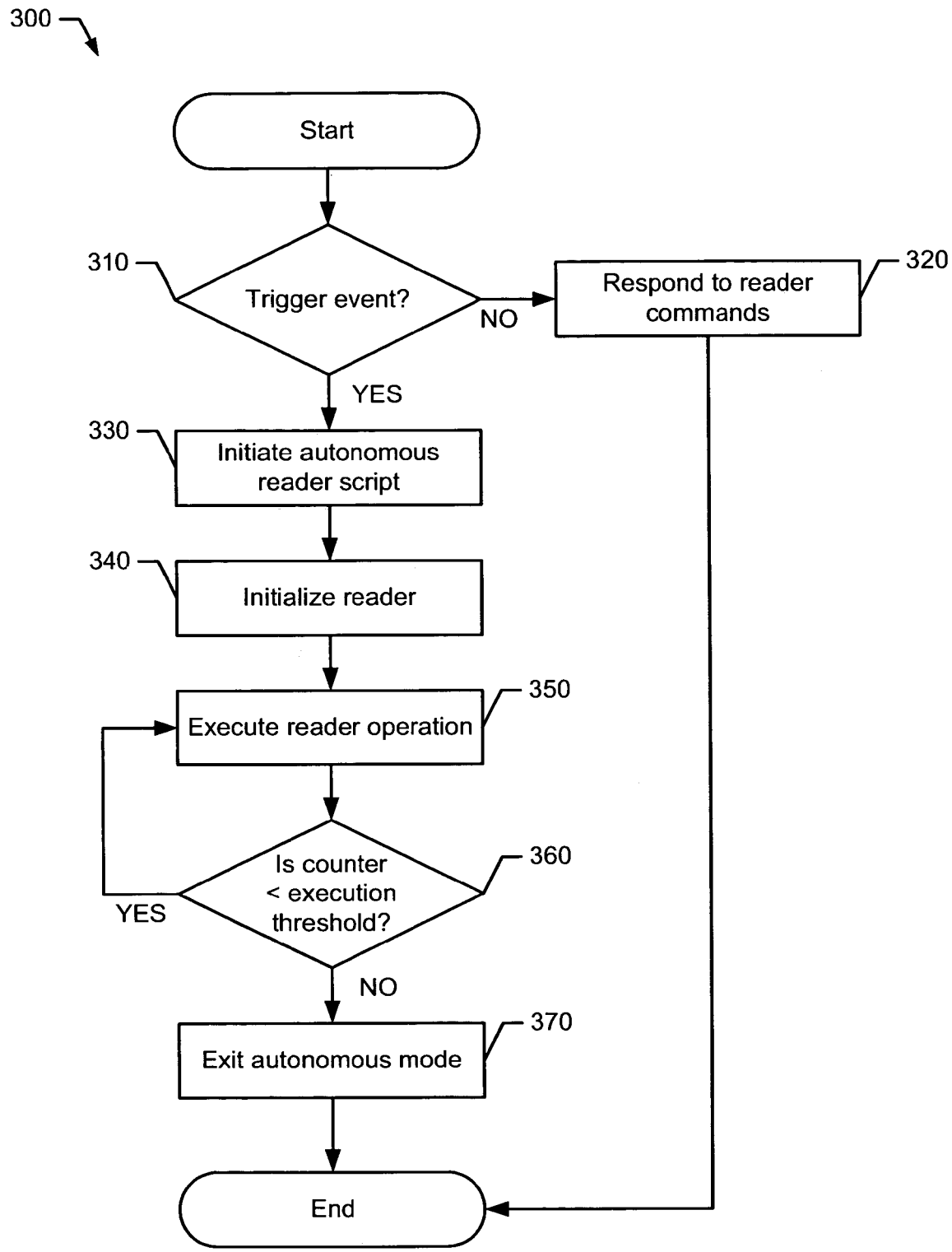
FIG. 3 is a flow diagram representation of one manner in which an example RFID reader of FIG. 2 may be configured to operate.

FIG. 3 depicts one manner in which the example RFID reader 200 of FIG. 2 may be configured to provide an RFID system. The example process 300 of FIG. 3 may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 3, these actions can be performed in other temporal sequences. Again, the example process 300 is merely provided and described in conjunction with the apparatus of FIGS. 1 and 2 as an example of one way to provide an RFID system.

In the example of FIG. 3, the process 300 may begin with the RFID reader 200 (e.g., via the controller 230) monitoring for a trigger event associated with the autonomous mode (block 310). In the autonomous mode, the RFID reader 200 may initiate the autonomous reader script 250 to operate independent of reader commands from a host computer or server (e.g., the host computer 150 of FIG. 1). The RFID reader 200 may automatically operate in the autonomous mode in response to detecting an operating condition associated with the RFID reader 200. In one example, the host computer 150 may require maintenance during a predefined time period. Accordingly, the RFID reader 200 may continue to operate during that particular predefined time period by operating the autonomous mode. Alternatively, the RFID reader 200 may operate in the autonomous mode in response to detecting a user input.

If the RFID reader 200 does not detect a trigger event associated with the autonomous mode, the RFID reader 200 may respond to one or more reader commands from the host computer 150 to provide an RFID system (e.g., the RFID system 110 of FIG. 1) (block 320). Based on reader commands from the host computer 150, the RFID reader 200 may execute corresponding reader operations to provide the RFID system 110. In one example, the RFID reader 200 may execute a reading operation in response to a reader command instructing the RFID reader 200 to execute the reading operation from the host computer 150.

Otherwise if the RFID reader 200 detects a trigger event associated with the autonomous mode, the RFID reader 200 may initialize the autonomous reader script 260 (block 330). The autonomous reader script 260 may initialize the RFID reader 200 to operate in the autonomous mode (block 340). As noted above, the autonomous reader script 260 may include configuration information so that the RFID reader 200 may operate to provide an RFID system without reader command(s) from the host computer 150.

Accordingly, the RFID reader 200 may execute reader operation independent of reader command(s) from the host computer 150 (block 350). The RFID reader 200 may execute a reading operation, a writing operation, a disabling operation, a storing operation, a filtering operation, or any other suitable reader operation. In one example, the RFID reader 200 may perform a reading operation to retrieve data from a predefined number of RFID tags. Accordingly, the RFID reader 200 may cache the retrieved data in the memory 230 and report the retrieved data to the host computer 150 after retrieving data from all of the predefined number of RFID tags. In another example, the RFID reader 200 may disable an RFID tag.

The RFID reader 200 may determine whether to continue operating in the autonomous mode. In particular, the RFID reader 200 may determine whether a counter is less than an execution threshold (block 360). In one example, the execution threshold may a predefined time period such as during a maintenance period of the host computer 150. In another example, the execution threshold may be a predefined number of times that the RFID reader 200 may execute reader operation(s).

If the counter is less than the execution threshold at block 360, the RFID reader 200 may return to block 350 to continue operating in the autonomous mode. That is, the RFID reader 200 may execute another reader operation independent of reader command(s) from the host computer 150. Otherwise if the counter is greater than or equal to the execution threshold at block 360, the RFID reader 200 may stop operating in the autonomous mode (block 370). The methods and apparatus described herein are not limited in this regard.

Although the methods and apparatus disclosed herein are well suited for wireless personal area networks (WPANs), the methods and apparatus disclosed herein may be applied to other suitable types of wireless communication networks. For example, the methods and apparatus disclosed herein may be applied to wireless local area networks (WLANs), wireless metropolitan area networks (WMANs), and/or wireless wide area networks (WWANs).

Figure 4:
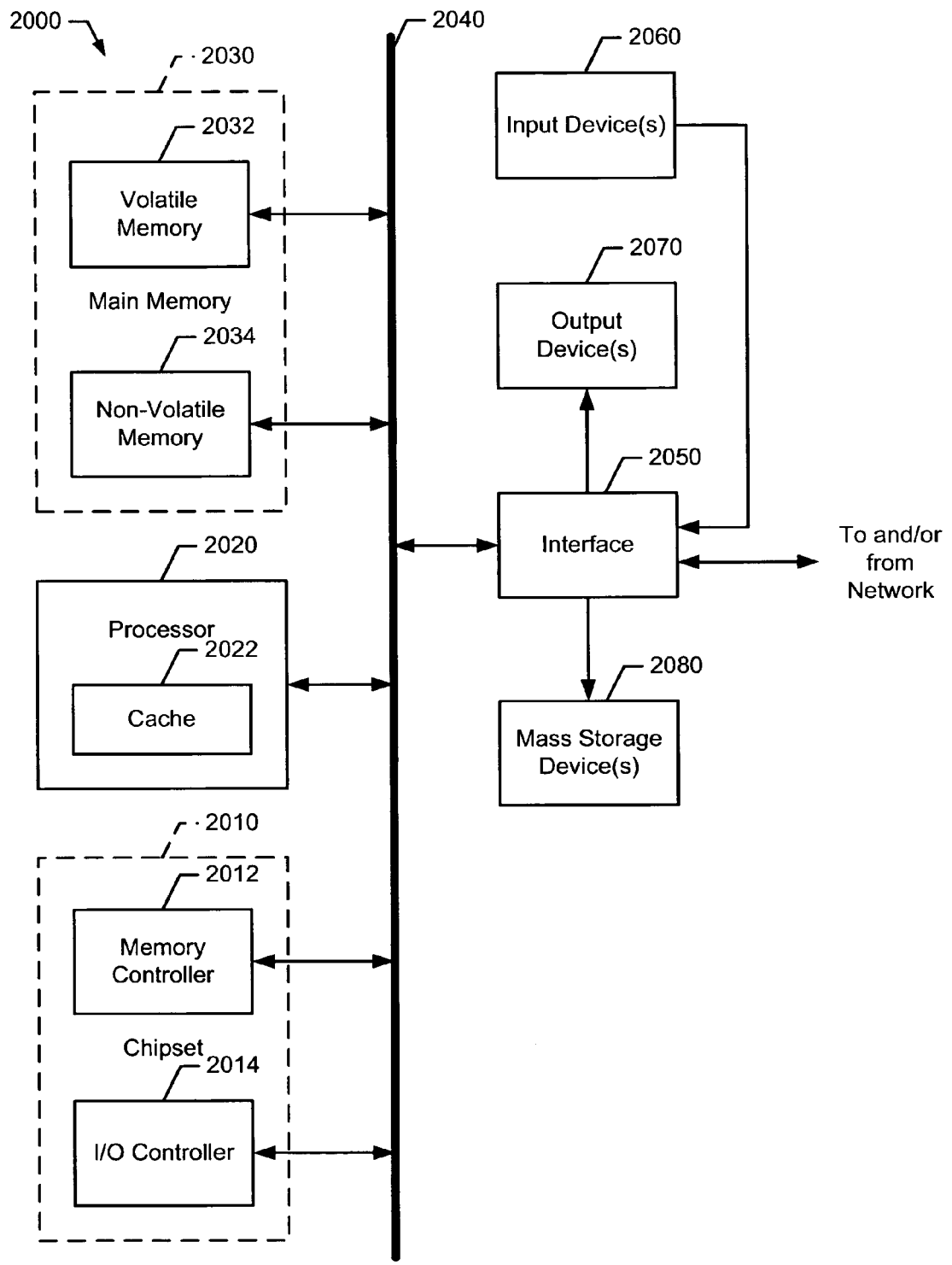
FIG. 4 is a block diagram representation of an example processor system that may be used to implement the example RFID reader of FIG. 2.

FIG. 4 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 4 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 4 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   initiating an autonomous reader script at a radio frequency identification (RFID) reader of an RFID system having a host computer and one or more RFID tags communicatively coupled to the RFID reader, the host computer configured to provide read commands to the RFID reader to cause the RFID reader to perform various read operations, the initiating being performed automatically at the RFID reader independent of the host computer and the one or more RFID tags, and the initiating being in response to detecting a signal received from the host computer having a signal strength that is below a threshold level; and
   executing a reader operation at the RFID reader based on the autonomous reader script.

2. A method as defined in claim 1, wherein initiating the autonomous reader script at the RFID reader comprises initiating a script having configuration information associated with operating the RFID reader independent of a reader command from the host computer, the one or more RFID tags, or a server.

3. A method as defined in claim 1, wherein executing a reader operation at the RFID reader based on the autonomous reader script comprises executing one of a reading operation, a writing operation, a disabling operation, a storing operation, or a filtering operation based on the autonomous reader script.

4. A method as defined in claim 1, wherein executing a reader operation at the RFID reader based on the autonomous reader script comprises independently retrieving data from the one or more RFID tags at the RFID reader.

5. A method as defined in claim 1 further comprising transmitting data associated with the one or more RFID tags to one of the host computer or a server.

6. A method as defined in claim 1 further comprising retrieving the autonomous reader script from one of the host computer or a server.

7. A method as defined in claim 1 further comprising storing the autonomous reader script at a memory of the RFID reader.

8. An article of manufacture including content, which when accessed, causes a machine to:
  initiate an autonomous reader script at a radio frequency identification (RFID) reader of an RFID system having a host computer and one or more RFID tags communicatively coupled to the RFID reader, the host computer configured to provide read commands to the RFID reader to cause the RFID reader to perform various read operations, the initiation to be performed automatically at the RFID reader independent of the host computer and the one or more RFID tags, and the initiation to be in response to detecting a signal received from the host computer having a signal strength that is below a threshold level; and
  execute a reader operation at the RFID reader based on the autonomous reader script.

9. An article of manufacture as defined in claim 8, wherein the content, when accessed, causes the machine to initiate the autonomous reader script at the RFID reader by initiating a script having configuration information associated with operating the RFID reader independent of a reader command from the host computer, the one or more RFID tags, or a server.

10. An article of manufacture as defined in claim 8, wherein the content, when accessed, causes the machine to execute the reader operation at the RFID reader based on the autonomous reader script by executing one of a reading operation, a writing operation, a disabling operation, a storing operation, or a filtering operation based on the autonomous reader script.

11. An article of manufacture as defined in claim 8, wherein the content, when accessed, causes the machine to execute the reader operation at the RFID reader based on the autonomous reader script by independently retrieving data from the one or more RFID tags at the RFID reader.

12. An article of manufacture as defined in claim 8, wherein the content, when accessed, causes the machine to transmit data associated with the one or more RFID tags to one of the host computer or a server.

13. An article of manufacture as defined in claim 8, wherein the content, when accessed, causes the machine to retrieve the autonomous reader script from one of the host computer or a server.

14. An article of manufacture as defined in claim 8, wherein the content, when accessed, causes the machine to store the autonomous reader script at a memory of the RFID reader.

15. An apparatus comprising:
  a communication interface communicatively coupled to one or more radio frequency identification (RFID) tags and a host computer of an RFID system, the host computer configured to provide read commands to an RFID reader of the RFID system to cause the RFID reader to perform various read operations;
  a memory to store an autonomous reader script; and
  a controller coupled to the communication interface and the memory to initialize automatically the autonomous configuration script at the RFID reader and to execute an operation associated with the RFID reader, the initialization to be performed automatically at the RFID reader independent of the host computer and the one or more RFID tags, and the initialization to be in response to detecting a signal received from the host computer having a signal strength that is below a threshold level.

16. An apparatus as defined in claim 15, wherein the autonomous reader script comprises a script having configuration information associated with operating the RFID reader independent of a reader command from the host computer, the one or more RFID tags, or a server.

17. An apparatus as defined in claim 15, wherein the operation associated with the RFID reader comprises one of a reading operation, a writing operation, a disabling operation, a storing operation, or a filtering operation.

18. An apparatus as defined in claim 15, wherein the controller is configured to retrieve independently data from the one or more RFID tags.

19. An apparatus as defined in claim 15, wherein the memory is configured to store data associated with the one or more RFID tags.

20. An apparatus as defined in claim 15, wherein the communication interface is configured to transmit data associated with the one or more RFID tags to one of the host computer or a server.

21. An apparatus as defined in claim 15, wherein the controller is configured to retrieve the autonomous reader script from one of the host computer or a server.

22. A system comprising:
  a flash memory; and
  a processor coupled to the flash memory to initiate an autonomous reader script at a radio frequency identification (RFID) reader of an RFID system having a host computer and one or more RFID tags communicatively coupled to the RFID reader, and to execute a reader operation at the RFID reader based on the autonomous reader script, the host computer being configured to provide read commands to the RFID reader to cause the RFID reader to perform various read operations, the automatically initiate being independent of the host computer and the one or more RFID tags, and in response to detecting a signal received from the host computer having a signal strength that is below a threshold level.

23. A system as defined in claim 22, wherein the autonomous reader script comprises a script having configuration information associated with operating the RFID reader independent of a reader command from the host computer, the one or more RFID tags, or a server.

24. A system as defined in claim 22, wherein the processor is configured to execute one of a reading operation, a writing operation, a disabling operation, a storing operation, or a filtering operation.

25. A system as defined in claim 22, wherein the processor is configured to retrieve independently data from the one or more RFID tags.

26. A system as defined in claim 22, wherein the flash memory is configured to store data associated with the one or more RFID tags.

27. A system as defined in claim 22, wherein the processor is configured to transmit data associated with the one or more RFID tags to one of the host computer or a server.

28. A system as defined in claim 22, wherein the processor is configured to retrieve the autonomous reader script from one of the host computer or a server.

29. A system as defined in claim 22, wherein the system comprises one of a laptop computer, a handheld computer, or a tablet computer.

* * * * *